US007412540B2

(12) United States Patent
Seto et al.

(10) Patent No.: US 7,412,540 B2
(45) Date of Patent: Aug. 12, 2008

(54) DATA ENCODING AND DECODING IN A DATA STORAGE SYSTEM

(75) Inventors: Pak-Lung Seto, Shrewsbury, MA (US); Deif N. Atallah, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1038 days.

(21) Appl. No.: 10/815,269

(22) Filed: Mar. 31, 2004

(65) Prior Publication Data

US 2005/0223116 A1    Oct. 6, 2005

(51) Int. Cl.
G06F 15/16 (2006.01)
(52) U.S. Cl. ..................................... 709/246
(58) Field of Classification Search ................. 709/246
See application file for complete search history.

(56) References Cited

U.S. PATENT DOCUMENTS

| 2002/0143994 | A1* | 10/2002 | Sun et al. ..................... 709/246 |
| 2002/0178215 | A1* | 11/2002 | Laksono et al. ............. 709/203 |
| 2002/0178278 | A1* | 11/2002 | Ducharme .................. 709/231 |
| 2003/0105830 | A1  | 6/2003  | Pham et al. |

FOREIGN PATENT DOCUMENTS

| EP | 0883270 A1 | 12/1998 |
| EP | 1158743 A2 | 11/2001 |
| WO | WO-0210929 A1 | 2/2002 |

OTHER PUBLICATIONS

"American National Standard for Information Technology- Fibre Channel- Physical and Signalling Interface-3 (FC-PH-3)", *Developed by incits, Where IT all Begins, Table of Contents*, (1998),6 pgs.
"ATM User-Network Interface (UNI) Signaling Specification", *The ATM Forum Technical Committee, af-sig-0061.001*, (Apr. 2002),6 pgs.
"PCI Express Base Specification Revision 1.0", *PCI Express, Table of Contents*, (Jul. 22, 2002),15 pgs.
"PCI-X Addendum to the PCI Local Bus Specification", *Revision 1.0a, Table of Contents*, (Jul. 24, 2000),9 pgs.

(Continued)

*Primary Examiner*—Krisna Lim
(74) *Attorney, Agent, or Firm*—Grossman, Tucker, Perreault & Pfleger, PLLC

(57) ABSTRACT

A method according to one embodiment may include transmitting a frame from a transmitting device to a receiving device via a communication network of a data storage system, enabling an encoding operation of the transmitting device to encode decoded data into encoded data and transmitting the encoded data in the frame via the communication network if the receiving device has a decoding operation capable of decoding the encoded data into the decoded data, and disabling the encoding operation and transmitting the decoded data in the frame via the communication network to the receiving device if the receiving device does not have the decoding operation capable of decoding the encoded data into the decoded data. Of course, many alternatives, variations, and modifications are possible without departing from this embodiment.

25 Claims, 6 Drawing Sheets

OTHER PUBLICATIONS

"Serial ATA: High Speed Serialized AT Attachment, Serial ATA Workgroup", *Revision 1.0, Table of Contents*, APT Technologies, Inc.,(Aug. 29, 2001),10 pgs.

"Working Draft American National Standard, Project T10/1601-D", *Revision 1, Table of Contents*, Information Technology- Serial Attached SCSI- 1.1 (SAS- 1.1),(Sep. 18, 2003),24 pgs.

Satran, Julian , "iSCSI", *IP Storage Working Group, Internet Draft, Table of Contents* (Jan. 19, 2003),9 pgs.

*International Search Report and Written Opinion of the International Searching Authority* Dated Aug. 19, 2005, PCT/US2005/010174, 13 Pages.

* cited by examiner

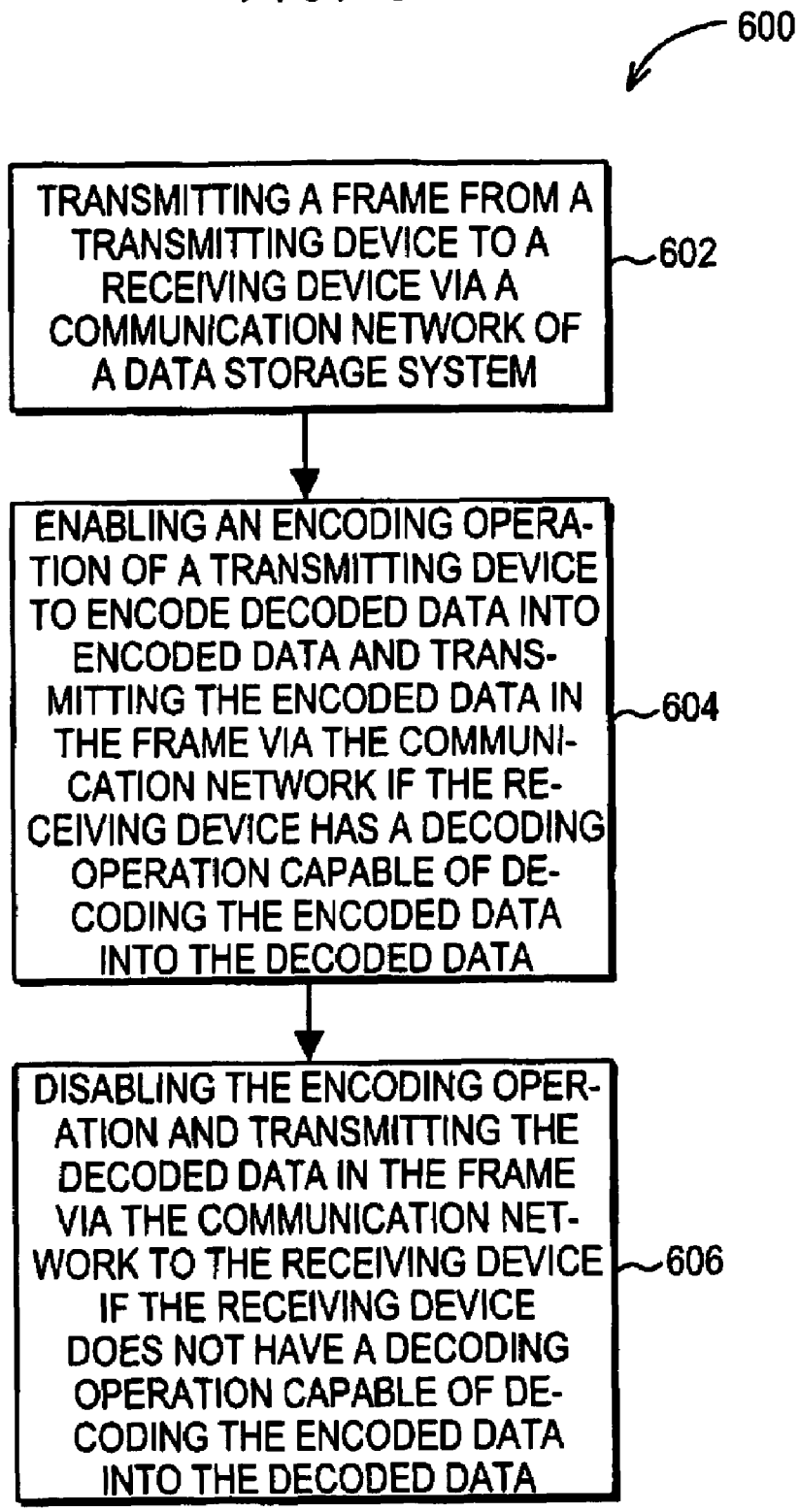

DATA ENCODING AND DECODING IN A DATA STORAGE SYSTEM

FIELD

This disclosure relates to data encoding and decoding in a data storage system.

BACKGROUND

A conventional data storage system may include one device capable of bidirectional communication with another device. One device may include a computer node having a host bus adapter (HBA). The other device may be a mass storage device. A variety of intermediate devices such as expanders, bridges, routers, and switches may also be utilized in the data storage system to facilitate coupling and communication between a plurality of HBAs and mass storage devices. The HBA and mass storage device may each function as a transmitting and receiving device in order to exchange data and/or commands with each other using one or more of a variety of communication protocols that transmit payload via frames via a communication network. However, value added encoding and decoding circuitry have not been available in the transmitting and receiving devices of the data storage system in a prior art embodiment.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

FIG. 6 is a flow chart illustrating operations according to an embodiment.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
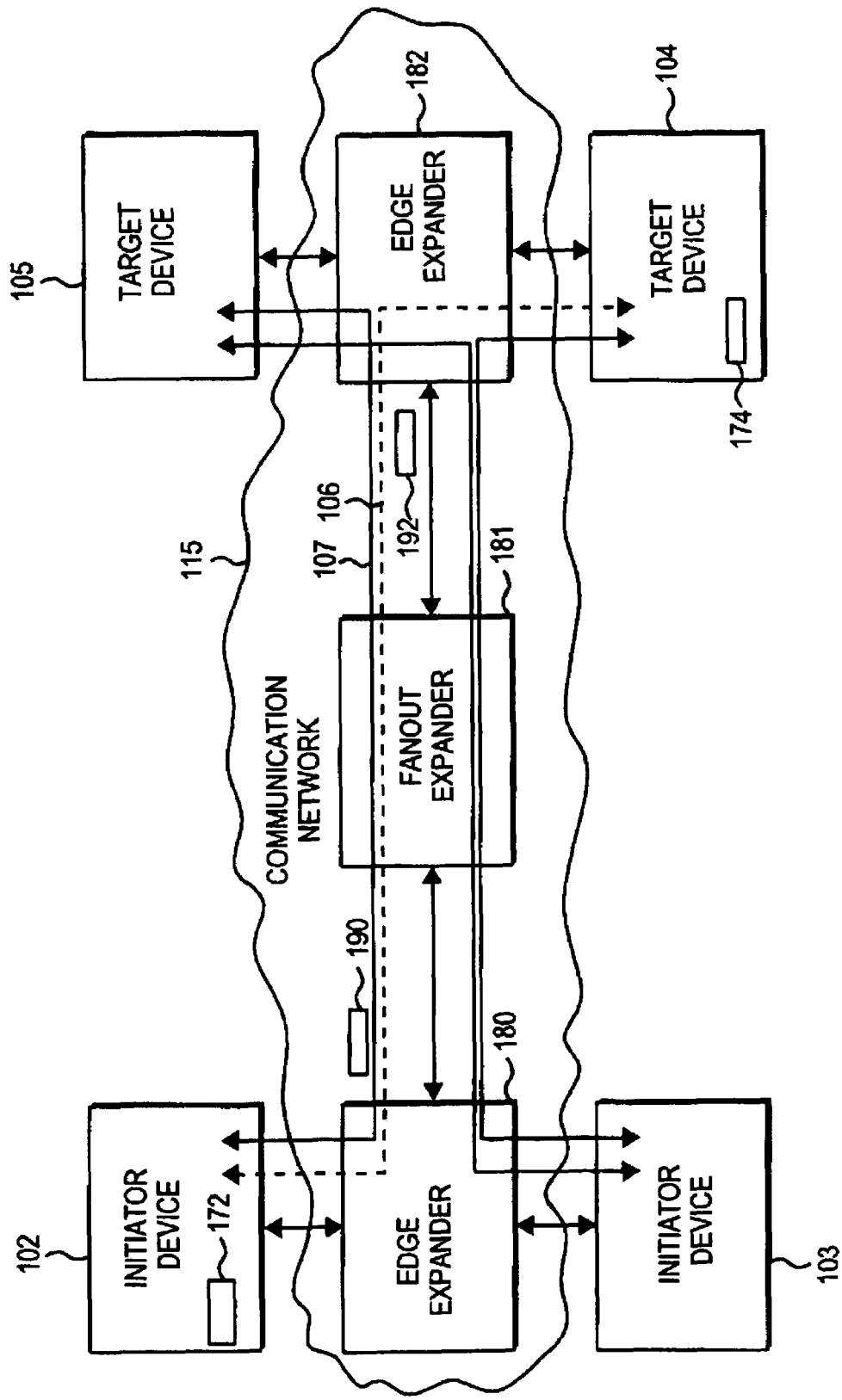
FIG. 1 is a diagram illustrating a system embodiment.

FIG. 1 illustrates a data storage system 100 consistent with an embodiment including a plurality of initiator devices 102, 103 capable of bidirectional communication with a plurality of target devices 104, 105 via one or more communication links of the communication network 115. Each of the initiator devices 102, 103 may be various computer servers each having a respective HBA as further described herein. Each of the target devices 104, 105 may comprise mass storage. Each mass storage may include one or more mass storage devices, e.g., one or more redundant arrays of independent disks (RAID) and/or peripheral devices.

The communication network 115 may include a plurality of intermediate devices such as expanders, bridges, routers, and/or switches. In the system 100 of FIG. 1, an edge expander 180 may be coupled to initiator devices 102 and 103. Similarly, another edge expander 182 may be coupled to target devices 104 and 105. Finally, a fanout expander 181 may be coupled to the both edge expanders 180 and 182. As used herein, an "expander" may be defined as a device that may facilitate communication among a plurality of devices. Only two initiator devices 102, 103, two target devices 104, 105, and three expanders 180, 181, 182 are illustrated in the system 100 of FIG. 1 for simplicity of explanation. Those skilled in the art will recognize that any plurality of initiator devices, target devices, expanders, and/or other intermediate devices may be utilized in other embodiments.

The initiator devices 102, 103 and target devices 104, 105 may act as both transmitting and receiving devices to transmit data and/or commands to each other. Such data and/or commands may be included in frames, e.g., frames 190, 192. A "frame" as used herein may comprise one or more symbols and values. A large number of frames from many different devices such as initiator devices 102, 103 and target devices 104, 105 may be transmitted and received.

The initiator devices 102, 103 and target devices 104, 105 may be able to communicate using one or more communication protocols. Exemplary communication protocols may include, but are not limited to, Fibre Channel (FC), Serial Advanced Technology Attachment (S-ATA), Serial Attached Small Computer Systems Interface (SAS) protocol, internet Small Computer System Interface (iSCSI), and/or asynchronous transfer mode (ATM).

If a FC protocol is used, it may comply or be compatible with the interface/protocol described in ANSI Standard Fibre Channel (FC) Physical and Signaling Interface-3X3.303: 1998 Specification. Alternatively, if a S-ATA protocol is used, it may comply or be compatible with the protocol described in "Serial ATA: High Speed Serialized AT Attachment," Revision 1.0, published on Aug. 29, 2001 by the Serial ATA Working Group. Further alternatively, if a SAS protocol is used, it may comply or be compatible with the protocol described in "Information Technology-Serial Attached SCSI-1.1 (SAS)," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or later-published versions of the SAS Standard. Further alternatively, if an iSCSI protocol is used, it may comply or be compatible with the protocol described in "IP Storage Working Group, Internet Draft, draft-itef-ips-iscsi-20.txt", published Jan. 13, 2003 by the Internet Engineering Task Force (ITEF) and/or later published versions of the same. Further alternatively, if an ATM protocol is used, it may comply or be compatible with the plurality of ATM Standards approved by the ATM Forum including, for example, "ATM User-Network Interface (UNI) Signaling Specification" published April 2002 by the ATM Forum.

Advantageously, one or more of the initiator and target devices may have encoding/decoding operations to provide for enhanced communication capabilities between such devices. For example, initiator device 102 may have encoding/decoding circuitry 172 to provide such encoding/decoding operations and target device 104 may also include encoding/decoding circuitry 174 to provide such encoding/decoding operations. As used herein, "circuitry" may comprise, for example, singly or in any combination, hardwired circuitry, programmable circuitry, state machine circuitry, and/or firmware that stores instructions executed by programmable circuitry. Also as used herein, "encoding" may comprise converting data from a first form to a second form and "decoding" may comprise converting data from the second form back into the first form. Such encoding operations may include, but are not limited to, data compression, data encryption, and data stripping.

When initiator device 102 establishes a connection with target device 104 via a communication link 106 it may ascertain that the target device 104 is capable of communicating utilizing the encoding/decoding operations providing by circuitry 174. If the initiator device 102 is transmitting data to the target device 104, it may then encode decoded data into encoded data for transmission in frame 192 to target device 104 if the decoding operations of the target device 104 are capable of decoding the encoded data in the frame 192. Alternatively, if the initiator device 102 is transmitting data to the target device 105 via communication link 107, it may detect that the target device does not have a decoding operation that is capable of decoding encoded data that it provides. Accordingly, the initiator device 102 may then disable its encoding operation and transmit decoded data to target device 105 in frame 190 via communication link 107. Therefore, the initiator device 102 can enable or disable its encoding/decoding operations depending on whether it has established communication with target device 104 or 105 to effectively communicate with a variety of devices.

Advantageously, only the devices 102, 104 utilizing such encoding/decoding operations may be required to understand that the devices 102, 104 are communicating utilizing such operations. Any intermediate devices of the communication network 115, such as expanders 180, 181, 182, may not be required to understand any variety of encoding/decoding operations carried out by devices 102, 104. Hence, the communication network 115 facilitates transmission of frames, e.g., frames 190, 192, irrespective of the type of encoded data that may be included in such frames.

Accordingly, a transmitting device, e.g., device 102, having encoding operations and/or circuitry should be able to detect when it is coupled to a receiving device, e.g., device 104, having decoding operations and/or circuitry capable of decoding encoded data that may be encoded by the transmitting device in order to enable or disable the associated encoding and decoding operations. There are a variety of ways this may be accomplished. First, the encoding and decoding operations may be enabled/disabled by utilizing vendor unique Small Computer System Interface (SCSI) mode pages in SCSI applications over any communication protocol, e.g., FC, SAS, iSCSI.

Second, the encoding and decoding operations may be enabled/disabled utilizing special management applications of each device, e.g., devices 102, 104, thru in band or out of band communication. Third, the encoding and decoding operations may be enabled/disabled by utilizing a reserved field in the frame header of a received frame where the reserved field in one state indicates a desire to enable the operations and in another state indicates a desire to disable the operations. Fourth, the encoding and decoding operations may be enabled/disabled on a per command basis when the transmitting device, e.g., device 102, sends a command to the receiving device, e.g., device 104. Finally, the encoding and decoding operations may be preconfigured in a predetermined configuration so each device, e.g., devices 102, 104, will know that certain encoding and decoding features may be enabled in each device.

Figure 2:
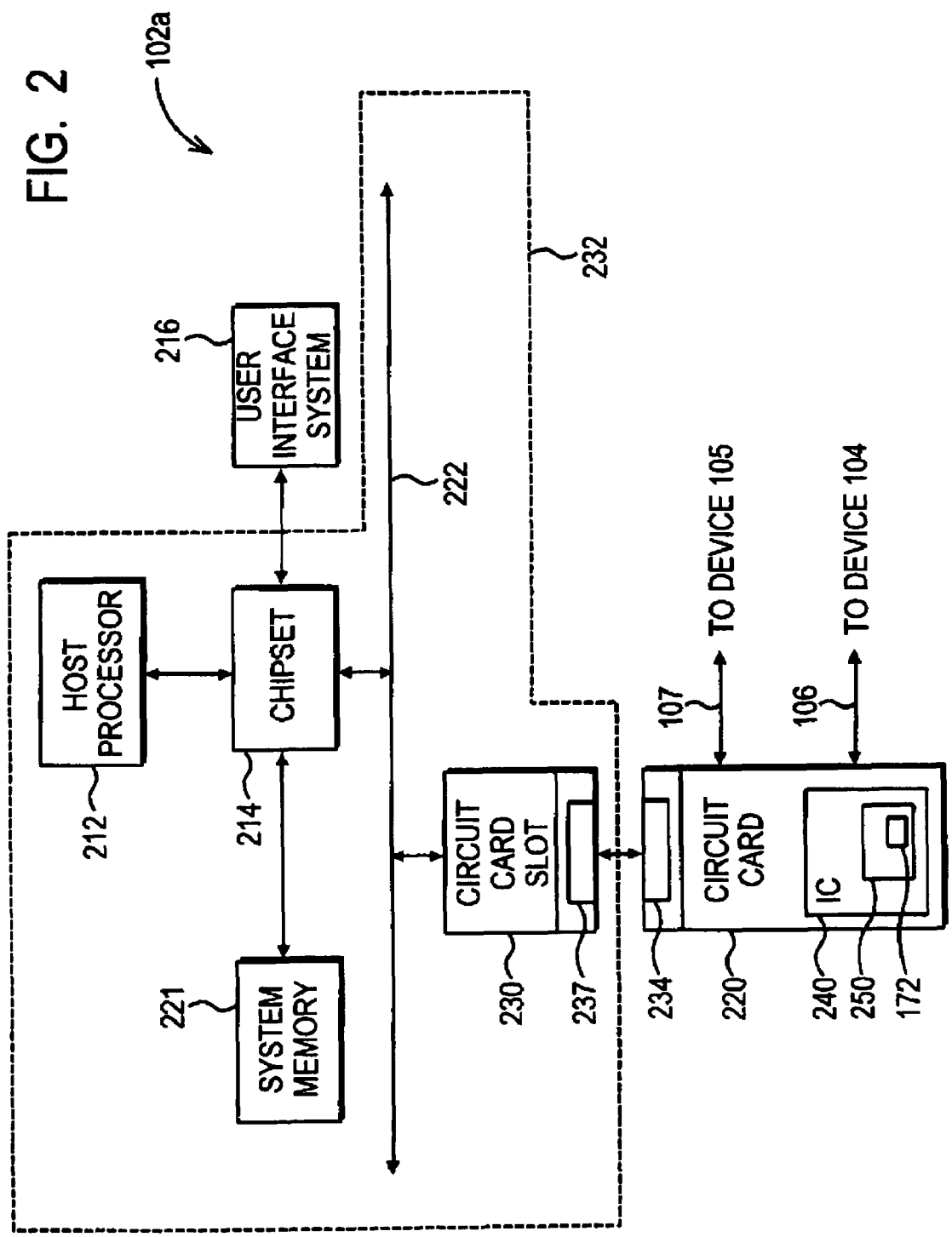
FIG. 2 is a diagram illustrating in greater detail a device in the system embodiment of FIG. 1.

FIG. 2 illustrates an embodiment 102a of the initiator device 102 of the system of FIG. 1. The initiator device 102a may include a computer node having a HBA, e.g., circuit card 220. The circuit card 220 may be capable of bidirectional communication with, at least, target device 104 via communication link 106. The HBA 220 may act as a transmitting and receiving device that transmits and receives data and/or command from other devices, e.g., device 104. The HBA 220 may have protocol engine circuitry 250 to facilitate such communication. The protocol engine circuitry 250 may exchange data and commands with other devices by transmission and reception of one or more frames, e.g., frames 190, 192. The protocol engine circuitry 250 may be included in an integrated circuit (IC) 240. As used herein, an "integrated circuit" or IC means a semiconductor device and/or microelectronic device, such as, for example, a semiconductor integrated circuit chip.

The target devices, e.g., target device 104, may also have such protocol engine circuitry. The HBA 220 may also provide encoding and decoding operations. Such operations may be implemented utilizing encoding and decoding circuitry 172. Such circuitry 172 may be comprised in the protocol engine circuitry 250 in one embodiment. Alternatively and/or additionally, the circuitry 172 may be located on an input side to the protocol engine circuitry 250.

The device 102a may include a host processor 212, a bus 222, a user interface system 216, a chipset 214, system memory 221, a circuit card slot 230, and a circuit card 220 capable of communicating with target device 104. The host processor 212 may include one or more processors known in the art such as an Intel® Pentium® IV processor commercially available from the Assignee of the subject application. The bus 222 may include various bus types to transfer data and commands. For instance, the bus 222 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 222 may alternatively comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface system 216 may include one or more devices for a human user to input commands and/or data and/or to monitor the system, such as, for example, a keyboard, pointing device, and/or video display. The chipset 214 may include a host bridge/hub system (not shown) that couples the processor 212, system memory 221, and user interface system 216 to each other and to the bus 222. Chipset 214 may include one or more integrated circuit chips, such as those selected from integrated circuit chipsets commercially available from the assignee of the subject application (e.g., graphics memory and I/O controller hub chipsets), although other integrated circuit chips may also, or alternatively be used. The processor 212, system memory 221, chipset 214, bus 222, and circuit card slot 230 may be on one circuit board 232 such as a system motherboard.

The circuit card 220 may be constructed to permit it to be inserted into the circuit card slot 230. When the circuit card 220 is properly inserted into the slot 230, connectors 234 and 237 become electrically and mechanically coupled to each other. When connectors 234 and 237 are so coupled to each other, the card 220 becomes electrically coupled to bus 222 and may exchange data and/or commands with system memory 221, host processor 212, and/or user interface system 216 via bus 222 and chipset 214.

Alternatively, without departing from this embodiment, the operative circuitry of the circuit card 220 may be included in other structures, systems, and/or devices. These other structures, systems, and/or devices may be, for example, in the motherboard 232, and coupled to the bus 222. These other structures, systems, and/or devices may also be, for example, comprised in chipset 214.

Figure 3:
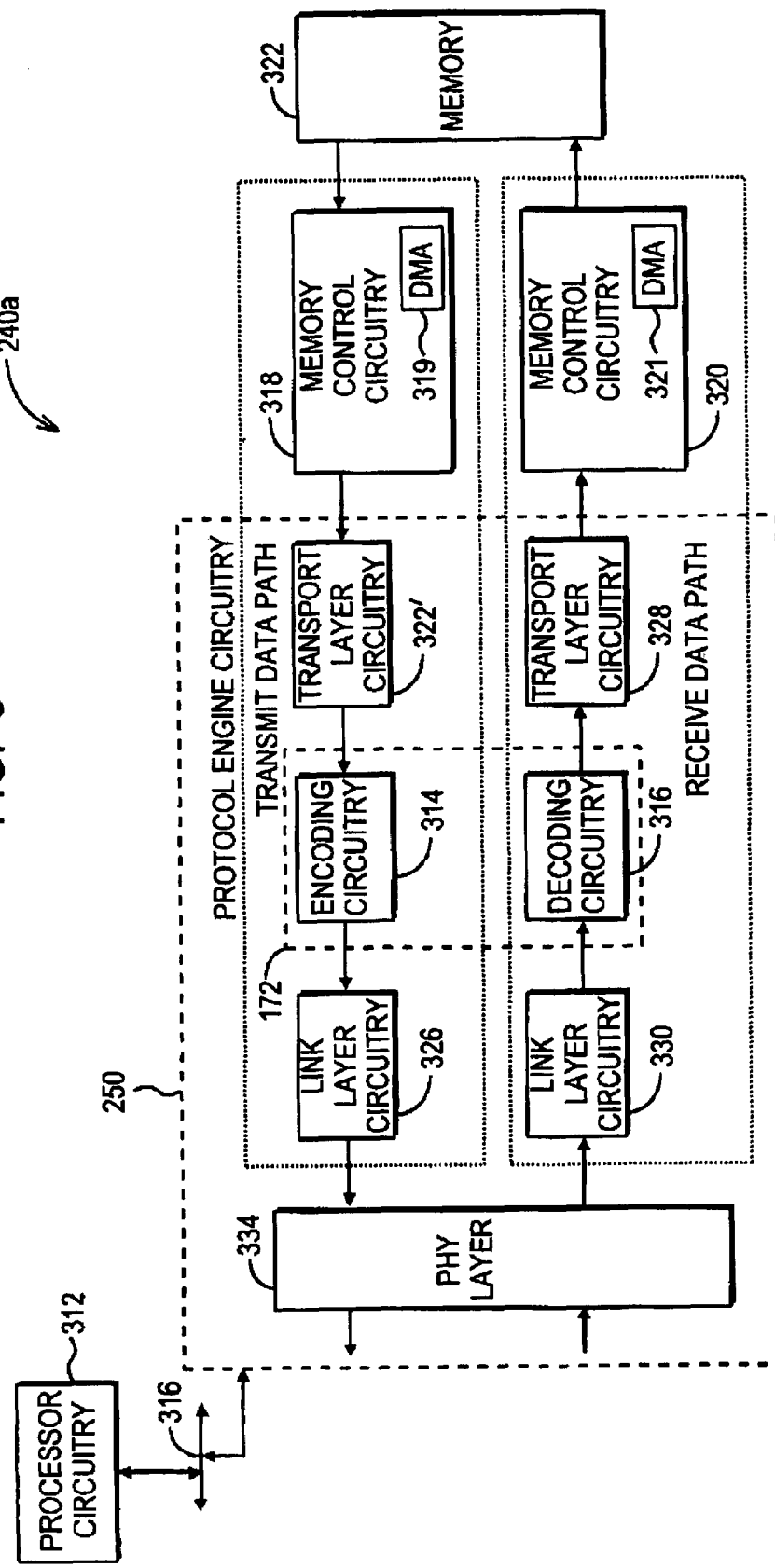
FIG. 3 is a diagram illustrating in greater detail one embodiment of the integrated circuit of the device of FIG. 2.

FIG. 3 illustrates portions an embodiment 240a of integrated circuit 240 of FIG. 2. The integrated circuit 240a may include the protocol engine circuitry 250, memory control circuitry 318 and 320, memory 322, processor circuitry 312, and processor bus 316. In this embodiment, the encoding and decoding circuitry 172 may be comprised in the protocol engine circuitry 250 to provide for frame based encoding and decoding. The encoding and decoding circuitry 172 may include encoding circuitry 314 associated with a transmit path and decoding circuitry 316 associated with a receive path. The protocol engine circuitry 250 may further include transport layer circuitry 322 and link layer circuitry 326 associated with the transmit path and transport layer circuitry 328 and link layer circuitry 330 associated with the receive path. The protocol engine circuitry 250 may also comprise PHY layer circuitry 334. The PHY layer circuitry 334 may comprise a physical PHY containing transceiver circuitry to interface to the applicable communication link. The PHY layer circuitry 334 may alternately and/or additionally comprise a virtual PHY to interface to another virtual PHY or to a physical PHY.

Memory control circuitry 318 may comprise direct memory access (DMA) circuitry 319. Memory control circuitry 318 may control retrieval of data from memory 322 and memory control circuitry 320 may control storage of data in memory 322. Memory control circuitry 318 and 320 may exchange data and/or commands with, at least, processor circuitry 312, protocol engine circuitry 250, and memory 322. Memory 322 may be may include one or more machine readable storage media such as random-access memory (RAM), dynamic RAM (DRAM), static RAM (SRAM) magnetic disk (e.g. floppy disk and hard drive) memory, optical disk (e.g. CD-ROM) memory, and/or any other device that can store information.

Machine-readable firmware program instructions may be stored in memory 322. These instructions may be accessed and executed by the integrated circuit 240. When executed by integrated circuit 240, these instructions may result in integrated circuit 240 performing the operations described herein as being performed by integrated circuit 240.

Processor circuitry 312 may include processor core circuitry that may comprise a plurality of processor cores. As used herein, a "processor core" may comprise hardwired circuitry, programmable circuitry, and/or state machine circuitry. Processor bus 316 may allow exchange of data and/or commands between at least the processor circuitry 312 and the protocol engine circuitry 250. Additional components (not illustrated) may also be coupled to the processor bus 316. The integrated circuit 240a may also include additional components (not illustrated) such as bridge circuitry to bridge the processor bus 316 with an I/O bus. Host interface circuitry (not illustrated) may couple the I/O bus with the bus 222 of the device 102a of FIG. 2 when the circuit card 220 is coupled to the circuit card slot 230.

In operation, data to be transmitted by the protocol engine circuitry 250 may be provided to the transport layer circuitry 322 via any variety of devices that can store information. In one instance, such data may be retrieved from memory 322 by DMA circuitry 319 and then provided to the transport layer circuitry 322. The input of data to the transmit path may also be from system memory 221 of the device of FIG. 2 if the circuit card 220 is coupled to the circuit card slot 230.

The transport layer circuitry 322 may then receive such data for transmission and, at least, parse such data into data units. For instance, the transport layer circuitry 322 may construct a plurality of frame information structures (FISs) for transmission from such data when the S-ATA communication protocol is being utilized. An encoding operation which may be performed by software and/or encoding circuitry 314 may then encode such data units. The encoded data unit may then be provided to the link layer circuitry 326. The link layer circuitry 326 may then insert a frame envelope around the encoded data unit to create a frame for transmission that will be accepted by any variety of intermediate devices in the communication network 115. Such frame envelope may include various primitives to define, at least, the boundaries of the frame to be transmitted. For example, such primitives may include a start of frame (SOF) and end of frame (EOF) primitives. Frame header information and error checking code information, e.g., a cyclic redundancy check (CRC) code may also be inserted. As used herein, a "primitive" may be defined as a group of one or more symbols, for example, representing control data to facilitate control of the transfer of information and/or to provide real time status information. Therefore, the encoding operation may encode only the payload of the frame that is transmitted.

In one embodiment, the encoding operation may be a data compression operation to compress decompressed data into compressed data. Such a data compression operation may be any variety of known compression operations. As used herein, "compression" means to convert data from a first form to a second form, where the second form is smaller in size than the first form. Any variety of compression ratios may also be utilized. In one instance, a lossless compression operation with about a 2:1 compression ratio may compress decompressed data units into compressed data units of about one half the length of the decompressed data units.

Figure 4A:
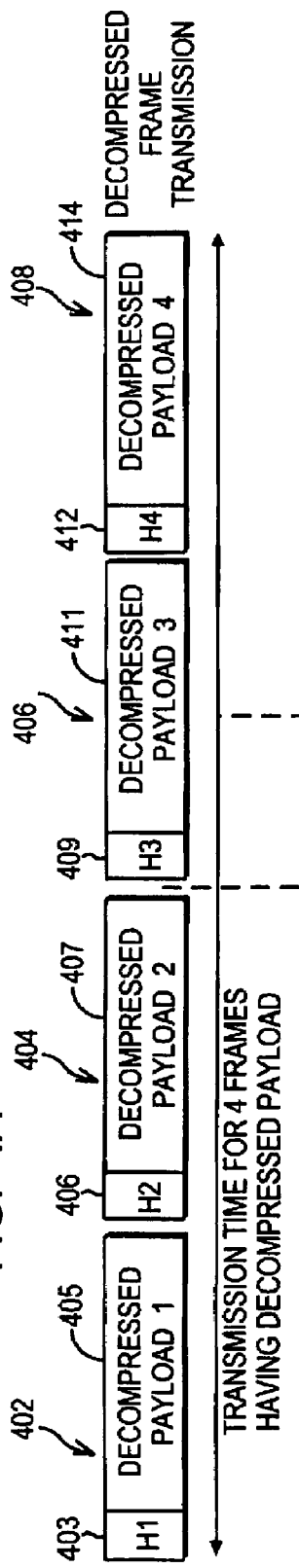
FIGS. 4A to 4C are diagrams illustrating data transmission rate improvements due to various methods of data decompression.
Figure 4B:
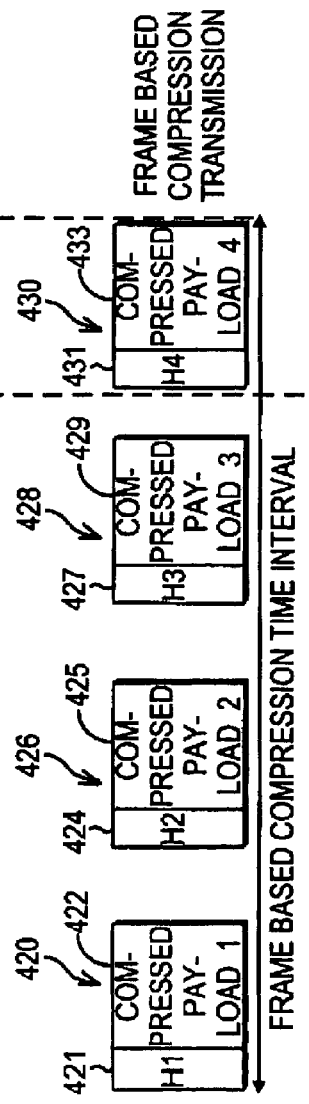

FIGS. 4A and 4B illustrates an example of frame based data compression that may be performed by integrated circuit 240a of FIG. 3 to illustrate the performance gain that may be achieved with such data compression. For comparison sake, four frames 402, 404, 406, 408 are illustrated where each contains associated header information 403, 406, 409, 412 and decompressed payloads 405, 407, 411, 414. Transmission of such four frames 402, 404, 406, 408 where each has a decompressed payload is illustrated as taking a defined time interval. In comparison, the transmission time interval for four frames 420, 426, 428, 430 where each includes compressed payloads 422, 425, 429, 433 may be much faster depending, at least in part, on the compression operation utilized.

With a compression operation having a compression ratio of about 2:1, the compressed payload may be about 50% of the length of the decompressed payload. For example, compressed payload 422 may be about 50% of the length of its decompressed payload 405, and compressed payload 425 may be about 50% of the length of its decompressed payload 407.

With the compression operation operating on the data units provided by the transport layer circuitry 322, the frame header portion of the frames 420, 426, 428, 430 may remain decompressed and therefore have a similar size as the frame headers of the frames 402, 404, 406, 408. Therefore, the actual data throughput will increase even if the physical link interface speed remains the same. For example, the transmission time for four frames 420, 426, 428, 430 having compressed payloads 422, 425, 429, 433 may be considerably faster than the transmission time for four frames 402, 404, 406, 408 having decompressed payloads 405, 407, 411, 414 of similar payload data. Therefore, system components including, but not limited to, the memory control circuitry 318, 320, memory 322, protocol engine circuitry 250, and compression and decompression operations, may be designed to take advantage of the increased data throughput.

Typically, a frame may also have an error checking code such as a cyclic redundancy check (CRC) to facilitate checking of the validity of the received data. There may be a variety of ways to handle such CRC checking using frame based compression. First, the CRC may be calculated on decompressed data and may be transmitted in the frame header of the frame also including compressed data. Upon receipt, the payload data may be decompressed and the receiving end may then apply the same mathematical calculation to the received decompressed payload that was applied to the decompressed transmitted payload. The resulting CRC may then be compared to the received CRC to ascertain the validity of the received data.

Alternatively, the original CRC on the decompressed payload may be compressed along with the payload and a new compressed payload CRC would be generated by the compression operation. The decompression operation would then result in the original CRC and decompressed payload which could then be checked by appropriate CRC circuitry on the receiving end. The original decompressed CRC may be optionally dropped in this instance or it could be retained.

Some communication protocols may define the CRC as not covering the header information content. Other communication protocols may have a separate CRC to cover the header information. The receiving device should be designed to take these into account. Some communication protocols may also support an embedded payload length field in the frame header that specifies the length of the payload. Since the compressed payload is shorter than the decompressed payload, the payload length field in the frame header may be updated to reflect the new shorter compressed payload. In addition, a frame header CRC may also need to be recalculated in such an instance. In addition, the original frame payload length field if supported may be optionally embedded in the first few bytes of the compressed payload.

The data that is not compressed in the frame header, e.g., headers 421, 424, 427, 431, may include frame header information and other frame primitives such as EOF and SOF primitives. The header to payload ratio is not drawn to scale in FIG. 4 for clarity of illustration. For example, for a frame compatible with the FC communication protocol, the ratio of the frame header 403 to payload 405 is about 24:2112. For a frame compatible with a SAS protocol such as Serial Small Computer System Interface Protocol (SSP), the ratio of the frame header to payload, e.g., header 403 to payload 405 is about 24:1024. However, once the payload is compressed, e.g., into compressed payloads the frame header to compressed payload ratio will decrease. The larger the compression ratio of decompressed to compressed data, the lower the ratio of the frame header to payload.

Figure 5:
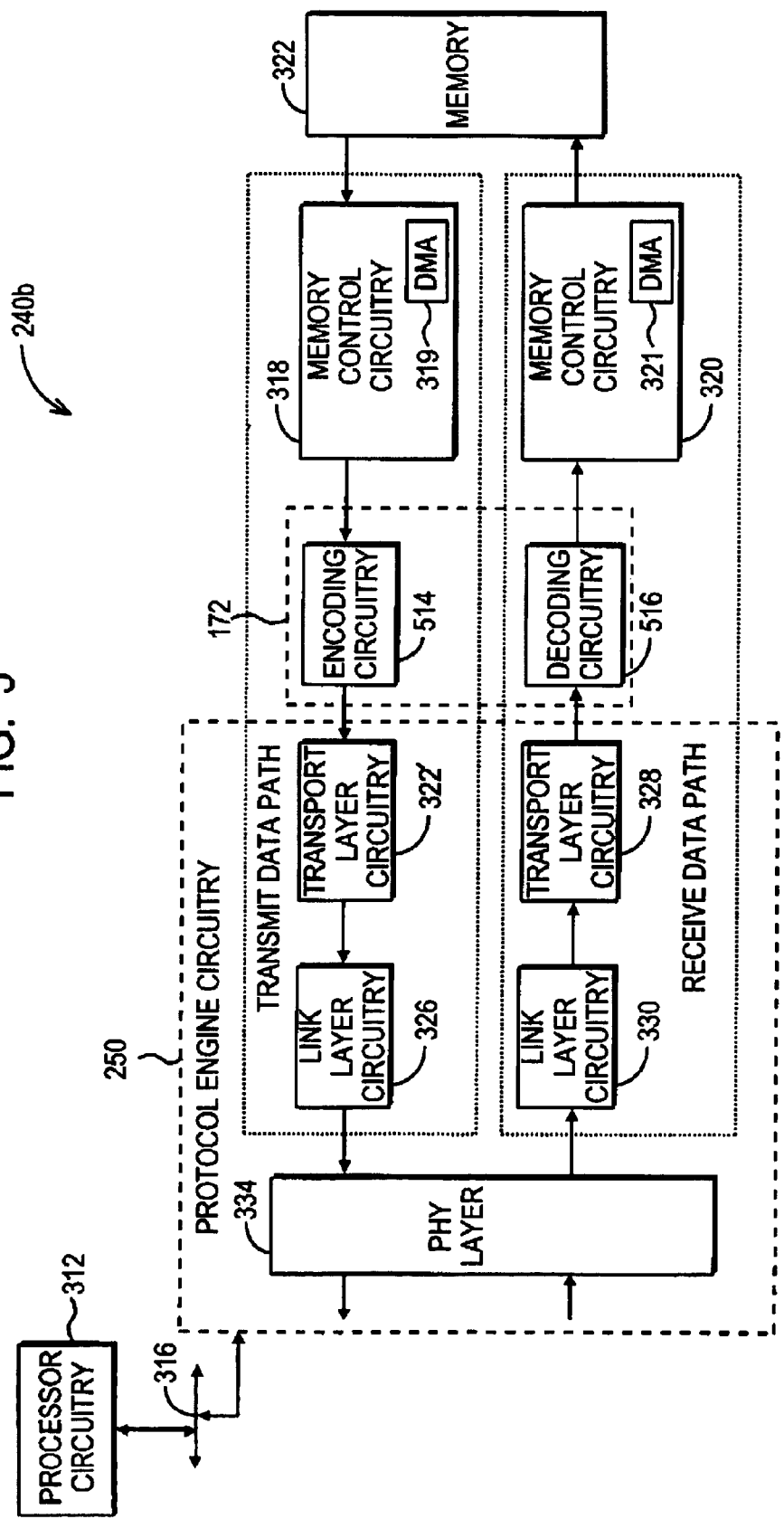
FIG. 5 is a diagram illustrating in greater detail another embodiment of the integrated circuit of the device of FIG. 2.

Hence, in another embodiment frame compression and decompression may be performed on an Input/Output (IO) command based level as opposed to the frame based level as previously detailed. FIG. 5 illustrates another embodiment 240b of the integrated circuit 240 where the encoding/decoding circuitry 172 is located at an input side to the protocol engine circuitry 250. Other components of FIG. 5 are similar to those of FIG. 3 and hence any repetitive description is omitted herein for clarity. The encoding/decoding circuitry 172 may provide data compression and decompression functions in one embodiment.

In operation, the data to be transmitted by the protocol engine circuitry 250 may be retrieved by memory control circuitry 318 from memory 322. After the data is retrieved, it may be compressed, e.g., by encoding circuitry 514. Then a stream of compressed data may be provided to the transport layer circuitry 322 of the protocol engine circuitry 250. The transport layer circuitry 322 may then parse such compressed data into compressed data units. Therefore, the transport layer circuitry 322 will be able to generate full sized units of compressed data and pass the full sized units directly to the link layer circuitry as usual. For example, in S-ATA a typical full sized FIS length may be 8 kilobytes (KB). In this instance, the transport layer would parse compressed data into full sized data units of 8 KB.

Figure 4C:
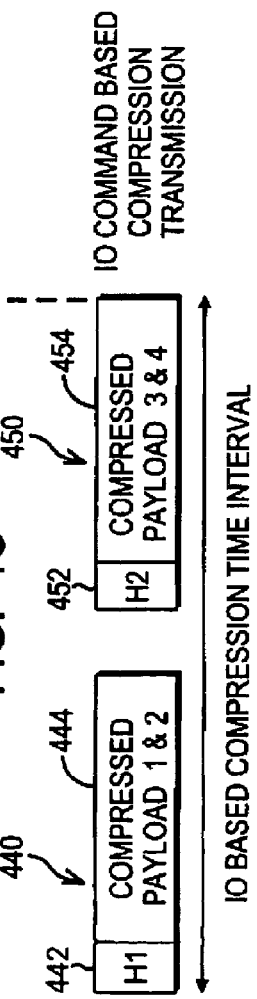

FIG. 4C illustrates an example of IO command based data compression that may be performed by the integrated circuit 240b of FIG. 5 to illustrate performance gain that may be achieved with such data compression. For comparison sake, FIG. 4A illustrates four frames 402, 404, 406, 408 where each contains associated header information 403, 406, 409, 412 and decompressed payload 405, 407, 411, 414. Transmission of such four frames 402, 404, 406, 408 is illustrated as taking a defined time interval. For further comparison, FIG. 4B illustrates a comparatively faster transmission time of four frames 420, 426, 428, 430.

Assuming a 50% compression ratio similar to FIG. 4B, payload 444 of frame 440 may contain compressed payload of payloads 405 and 407 of frames 402 and 404. Similarly, payload 454 of frame 450 may contain compressed payload of payloads 411 and 414 of frames 406 and 408. In other words, frames 440 and 450 may contain compressed data corresponding to data that would otherwise have to be transmitted in four frames 402, 404, 406, 408 of decompressed data. Therefore, in this instance illustrated in FIG. 4C, the IO command based compression may transmit up to two times more data in the same amount of transmission time as frames having decompressed data.

FIG. 4C illustrates an even slightly faster transmission time interval than FIG. 4B to transmit the same quantity of information. Assuming a similar compression ratio of 50%, the IO based compression time interval illustrated in FIG. 4C would be slightly shorter than the frame based compression time interval of FIG. 4B. This is because there are only two frame headers 442, 452 and one inter frame time gap between frames 440 and 450 as opposed to four frame headers 421, 424, 427, 431 and three inter frame time gaps between the four frames 420, 426, 428, 430 of FIG. 4B.

The compressed data in the IO command based compression of one frame may be variable in size and when decompressed may be larger than the maximum frame size supported by the link. Therefore, buffer management of the receiving device should be designed to take this into account.

In another embodiment, the encoding operation detailed with respect to FIG. 3 may be a data encryption operation to encrypt data into encrypted data. Such a data encryption operation may be any variety of known encryption operations. Any variety of encryption algorithms may also be utilized. The decoding operation may be a data decryption operation to decrypt the encrypted data back into decrypted data. Hence, security of transmission of the communication network 115 may be improved. The encryption/decryption operations may be utilized independently of the compression/decompression operations earlier detailed. Alternatively, the encryption/decryption operations and compression/decompression operations may be implemented at the same time.

In yet another embodiment, the encoding operations may include data stripping operations to provide stripped data across multiple communication links in order spread a single data stream across the multiple links for higher aggregate bandwidth. The decoding operations in this embodiment may include a data reconstruction operation to reconstruct the data from the stripped data.

Data stripping may include a variety of data stripping methods to stripe data across a plurality of communication links, e.g., of a wide port using a SAS communication protocol. One way of data stripping may be frame based data stripping. For example, if a wide port has four communication links, such frame based data stripping may transmit frame 1 via link 1, frame 2 via link 2, frame 3 by link 4, frame 4 via link 1, frame 5 via link 1, and so on. Another way of data stripping may be Dword based data stripping. Using a similar four link example, this Dword method of stripping data may transmit Dword 1 via link 1, Dword 2 via link 2, Dword 3 via link 3, Dword 4 via link 4, Dword 5 via link 1, and so on. Yet another way of data stripping may be byte word stripping where bytes may be stripped across multiple communication links in a defined pattern.

As long as the transmitting device and receiving device utilizing a plurality of communication links, e.g., via a wide port, understand how data is being stripped across multiple links, the data can be stripped and reconstructed using the same algorithm. Again, other features such as compression and encryption may be used together with the data stripping operation. This provides enhanced communication capabilities for some communication protocols such as SAS that does not currently allow data stripping across multiple links within a wide port.

FIG. 6 is a flow chart of exemplary operations 600 consistent with an embodiment. Operation 602 may include transmitting a frame from a transmitting device to a receiving device via a communication network of a data storage system. Operation 604 may include enabling an encoding operation of the transmitting device to encode decoded data into encoded data and transmitting the encoded data in the frame via the communication network if the receiving device has a decoding operation capable of decoding the encoded data into the decoded data. Finally, operation 606 may include disabling the encoding operation and transmitting the decoded data in the frame via the communication network to the receiving device if the receiving device does not have the decoding operation capable of decoding the encoded data into the decoded data.

It will be appreciated that the functionality described for all the embodiments described herein may be implemented using hardware, firmware, software, or a combination thereof. If implemented in software, machine such as a processing element, e.g., a processor circuitry 312, host processor 212, and one or more machine readable storage media may be utilized. One exemplary processing element may be a processor from the Pentium® family of processors made by the Assignee of this application, or the family of processors made by Motorola. Machine-readable media include any media capable of storing instructions adapted to be executed by a machine. Some examples of such media include, but are not limited to, read-only memory (ROM), RAM, programmable ROM (PROM), erasable programmable ROM (EPROM), electronically erasable programmable ROM (EEPROM), DRAM, magnetic disk (e.g. floppy disk and hard drive), optical disk (e.g. CD-ROM), and any other device that can store information. Further, the processing element and machine-readable storage medium may be part of a larger system that may contain various combinations of machine-readable storage devices through various input/output (I/O) controllers, which may be accessible by the processing element and which may be capable of storing a combination of computer program instructions and data.

Thus, in summary, one embodiment may comprise a method. The method may comprise transmitting a frame from a transmitting device to a receiving device via a communication network of a data storage system. The method may further comprise enabling an encoding operation of the transmitting device to encode decoded data into encoded data and transmitting the encoded data in the frame via the communication network if the receiving device has a decoding operation capable of decoding the encoded data into the decoded data, and disabling the encoding operation and transmitting the decoded data in the frame via the communication network to the receiving device if the receiving device does not have the decoding operation capable of decoding the encoded data into the decoded data. For example, if initiator device 102 transmits data via frames, e.g., frame 192, to target device 104 it may enable its encoding operation. Alternatively, device 102 may disable its encoding operation if it is transmitting data via frames, e.g., frame 190, to target device 105.

Advantageously, the encoding and decoding operations may comprise a variety of functions such as data compression, encryption, and data stripping to provide enhanced communication capabilities. Effective transmission rates may be considerable improved without alternating any components of the communication network 115. Security of transmission may also be improved. In addition, only the devices 102, 104 utilizing such encoding/decoding operations may be required to understand that the devices 102, 104 are communicating utilizing such operations. Therefore, any intermediate devices of the communication network 115, such as expanders 180, 181, 182, may not be required to understand any variety of encoding/decoding operations carried out by devices 102, 104. Hence, the communication network 115 facilitates transmission of frames, e.g., frames 190, 192, irrespective of the type of encoded data that may be included in such frames.

In summary, another embodiment may comprise an apparatus. The apparatus may comprise encoding circuitry capable of encoding decoded data into encoded data, and protocol engine circuitry. The protocol engine circuitry may be capable of transmitting a frame from the apparatus to a receiving device via a communication network of a data storage system, and capable of detecting if the receiving device has decoding circuitry capable of decoding the encoded data into the decoded data. The encoding circuitry providing the encoded data if the receiving device has decoding circuitry capable of decoding the encoded data into the decoded data, and the encoding circuitry providing the decoded data if the receiving device does not have decoding circuitry capable of decoding the encoded data into the decoded data.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:

transmitting a frame from a transmitting device to a receiving device via a communication network of a data storage system;

enabling an encoding operation of said transmitting device to encode decoded data into encoded data and transmitting said encoded data in said frame via said communication network if said receiving device has a decoding operation capable of decoding said encoded data into said decoded data; and disabling said encoding operation and transmitting said decoded data in said frame via said communication network to said receiving device if said receiving device does not have said decoding operation capable of decoding said encoded data into said decoded data.

2. The method of claim 1, wherein said encoding operation comprises a data compression operation, said encoded data comprises compressed data, said decoding operation comprises a data decompression operation, and said decoded data comprises decompressed data.

3. The method of claim 2, wherein said decompressed data is provided by transport layer circuitry of said transmitting device to said data compression operation and an output of said data compression operation is provided to link layer circuitry, said link layer circuitry providing said frame for transmission from said transmitting device to said receiving device.

4. The method of claim 2, wherein said decompressed data is provided by memory of said transmitting device to said data compression operation and an output of said data compression operation is provided to transport layer circuitry of said transmitting device.

5. The method of claim 1, wherein said encoding operation comprises a data encryption operation, said encoded data comprises encrypted data, said decoding operation comprises a data decryption operation, and said decoded data comprises decrypted data.

6. The method of claim 1, wherein said encoding circuitry comprises a data stripping operation, said encoded data comprises stripped data, and said decoding operation comprises a data reconstruction operation to reconstruct said decoded data from said stripped data.

7. An apparatus comprising:

encoding circuitry capable of encoding decoded data into encoded data; and protocol engine circuitry capable of transmitting a frame from said apparatus to a receiving device via a communication network of a data storage system, and capable of detecting if said receiving device has decoding circuitry capable of decoding said encoded data into said decoded data, said encoding circuitry providing said encoded data if said receiving device has decoding circuitry capable of decoding said encoded data into said decoded data, and said encoding circuitry providing said decoded data if said receiving device does not have decoding circuitry capable of decoding said encoded data into said decoded data.

8. The apparatus of claim 7, wherein said encoding circuitry comprises data compression circuitry, said encoded data comprises compressed data, said decoding circuitry comprises data decompression circuitry, and said decoded data comprises decompressed data.

9. The apparatus of claim 8, wherein said protocol engine circuitry comprises transport layer circuitry, said data compression circuitry, and link layer circuitry, said transport layer circuitry capable of constructing a decompressed unit of said decompressed data for transmission, said compression circuitry capable of compressing said decompressed data into compressed data and providing a compressed unit of said compressed data to said link layer circuitry, said link layer circuitry capable of receiving said compressed unit and creating said frame for transmission to said receiving device, said frame comprising said compressed unit.

10. The apparatus of claim 8, wherein said protocol engine circuitry comprises transport layer circuitry and link layer circuitry, said data compression circuitry capable of receiving decompressed data from memory of said apparatus, compressing said decompressed data into compressed data, and providing said decompressed data to said transport layer circuitry, said transport layer circuitry capable of constructing a full sized unit of said compressed data for transmission, said link layer circuitry capable of receiving said full sized unit and creating said frame for transmission to said receiving device, said frame comprising said full sized unit of compressed data.

11. The apparatus of claim 7, wherein said encoding circuitry comprises data encryption circuitry, said encoded data comprises encrypted data, said decoding circuitry comprises data decryption circuitry, and said decoded data comprises decrypted data.

12. The apparatus of claim 7, wherein said encoding circuitry comprises data stripping circuitry, said encoded data comprises stripped data, and said decoding circuitry comprises data reconstruction circuitry to reconstruct said decoded data from said stripped data.

13. A system comprising:

a circuit card comprising an integrated circuit, said circuit card capable of being coupled to a bus, said integrated circuit comprising:

encoding circuitry capable of encoding decoded data into encoded data; and protocol engine circuitry capable of transmitting a frame from said apparatus to a receiving device via a communication network of a data storage system, and capable of detecting if said receiving device has decoding circuitry capable of decoding said encoded data into said decoded data, said encoding circuitry providing said encoded data if said receiving device has decoding circuitry capable of decoding said encoded data into said decoded data, and said encoding circuitry providing said decoded data if said receiving device does not have decoding circuitry capable of decoding said encoded data into said decoded data.

14. The system of claim 13, wherein said encoding circuitry comprises data compression circuitry, said encoded data comprises compressed data, said decoding circuitry comprises data decompression circuitry, and said decoded data comprises decompressed data.

15. The system of claim 14, wherein said protocol engine circuitry comprises transport layer circuitry, said data compression circuitry, and link layer circuitry, said transport layer circuitry capable of constructing a decompressed unit of said decompressed data for transmission, said compression circuitry capable of compressing said decompressed data into compressed data and providing a compressed unit of said compressed data to said link layer circuitry, said link layer circuitry capable of receiving said compressed unit and creating said frame for transmission to said receiving device, said frame comprising said compressed unit.

16. The system of claim 14, wherein said protocol engine circuitry comprises transport layer circuitry and link layer circuitry, said data compression circuitry capable of receiving decompressed data from memory of said apparatus, compressing said decompressed data into compressed data, and providing said decompressed data to said transport layer circuitry, said transport layer circuitry capable of constructing a full sized unit of said compressed data for transmission, said link layer circuitry capable of receiving said full sized unit and creating said frame for transmission to said receiving device, said frame comprising said full sized unit of compressed data.

17. The system of claim 13, wherein said encoding circuitry comprises data encryption circuitry, said encoded data comprises encrypted data, said decoding circuitry comprises data decryption circuitry, and said decoded data comprises decrypted data.

18. The system of claim 13, wherein said encoding circuitry comprises data stripping circuitry, said encoded data comprises stripped data, and said decoding circuitry comprises data reconstruction circuitry to reconstruct said decoded data from said stripped data.

19. The system of claim 13, wherein the receiving device comprises a mass storage device.

20. An article comprising:
a storage medium having stored thereon instructions that when executed by a machine result in the following:
transmitting a frame from a transmitting device to a receiving device via a communication network of a data storage system;
enabling an encoding operation of said transmitting device to encode decoded data into encoded data and transmitting said encoded data in said frame via said communication network if said receiving device has a decoding operation capable of decoding said encoded data into said decoded data; and
disabling said encoding operation and transmitting said decoded data in said frame via said communication network to said receiving device if said receiving device does not have said decoding operation capable of decoding said encoded data into said decoded data.

21. The article of claim 20, wherein said encoding operation comprises a data compression operation, said encoded data comprises compressed data, said decoding operation comprises a data decompression operation, and said decoded data comprises decompressed data.

22. The article of claim 21, wherein said decompressed data is provided by transport layer circuitry of said transmitting device to said data compression operation and an output of said data compression operation is provided to link layer circuitry, said link layer circuitry providing said frame for transmission from said transmitting device to said receiving device.

23. The article of claim 21, wherein said decompressed data is provided by memory of said transmitting device to said data compression operation and an output of said data compression operation is provided to transport layer circuitry of said transmitting device.

24. The article of claim 20, wherein said encoding operation comprises a data encryption operation, said encoded data comprises encrypted data, said decoding operation comprises a data decryption operation, and said decoded data comprises decrypted data.

25. The article of claim 20, wherein said encoding circuitry comprises a data stripping operation, said encoded data comprises stripped data, and said decoding operation comprises a data reconstruction operation to reconstruct said decoded data from said stripped data.

* * * * *